US009247287B2

(12) United States Patent
Seo

(10) Patent No.: US 9,247,287 B2
(45) Date of Patent: Jan. 26, 2016

(54) COMMUNAL TELEVISION RECEIVING SYSTEM AND METHOD THEREOF

(71) Applicant: SAMSUNG ELECTRO-MECHANICS CO., LTD., Suwon-Si, Gyeonggi-Do (KR)

(72) Inventor: Won Seo, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 51 days.

(21) Appl. No.: 14/290,442

(22) Filed: May 29, 2014

(65) Prior Publication Data

US 2015/0156541 A1   Jun. 4, 2015

(30) Foreign Application Priority Data

Nov. 29, 2013   (KR) .......................... 10-2013-0147007

(51) Int. Cl.
| | |
|---|---|
| *H04N 7/18* | (2006.01) |
| *H04N 21/4363* | (2011.01) |
| *H04W 48/16* | (2009.01) |
| *H04N 21/4367* | (2011.01) |
| *H04N 21/6338* | (2011.01) |
| *H04N 21/443* | (2011.01) |
| *H04N 21/6332* | (2011.01) |
| *H04W 84/12* | (2009.01) |

(52) U.S. Cl.
CPC ..... *H04N 21/43637* (2013.01); *H04N 21/4367* (2013.01); *H04N 21/4436* (2013.01); *H04N 21/6332* (2013.01); *H04N 21/6338* (2013.01); *H04W 48/16* (2013.01); *H04W 84/12* (2013.01)

(58) Field of Classification Search
USPC .................................................. 725/74, 80–82
See application file for complete search history.

(56) References Cited

U.S. PATENT DOCUMENTS

| | | | | |
|---|---|---|---|---|
| 6,647,015 B2 * | 11/2003 | Malkemes | ........... | H04B 7/0845 370/329 |
| 7,827,581 B1 * | 11/2010 | Eiger | ................... | H04B 7/1858 370/401 |
| 8,295,224 B1 * | 10/2012 | Deshong | ............. | H04L 65/1026 370/316 |
| 2006/0203758 A1 * | 9/2006 | Tee | ....................... | H04W 88/04 370/315 |

FOREIGN PATENT DOCUMENTS

| | | |
|---|---|---|
| JP | 08-125600 A | 5/1996 |
| KR | 10-2007-0075685 A | 7/2007 |

* cited by examiner

*Primary Examiner* — Mulugeta Mengesha
(74) *Attorney, Agent, or Firm* — McDermott Will & Emery LLP

(57) ABSTRACT

A communal television receiving system may include a common wireless distributing apparatus performing a scanning operation for a wireless local area network (WLAN) communications module included in a preset WLAN communications network, determining transmission power with the WLAN communications module transmitting an acknowledgement (ACK) signal for the scanning operation, converting a received television signal into a WLAN signal having the determined transmission power, and transmitting the WLAN signal, and first to Nth wireless residential apparatuses transmitting the ACK signal as a response to the scanning operation, receiving the WLAN signal from the common wireless distributing apparatus, and outputting the television signal.

15 Claims, 11 Drawing Sheets

COMMUNAL TELEVISION RECEIVING SYSTEM AND METHOD THEREOF

CROSS-REFERENCE TO RELATED APPLICATION

This application claims the benefit of Korean Patent Application No. 10-2013-0147007 filed on Nov. 29, 2013, with the Korean Intellectual Property Office, the disclosure of which is incorporated herein by reference.

BACKGROUND

The present disclosure relates to a communal television receiving system and a method thereof.

A block of flats such as row houses, apartments, or the like, comprised of a plurality of residences generally uses a communal television reception system for the common reception of television broadcasts for all residences included therein.

Typically, such a communal television transmission receiving system is deployed in apartment buildings, villas, schools, hotels, multiplex housing, and the like in some countries.

Existing communal television transmission receiving systems may include a communal antenna receiving television broadcasts, a distributing apparatus connected to the communal antenna by a cable in a wired scheme and distributing a television signal to respective residences, and a residential television receiving apparatus connected to the distributing apparatus by a cable in a wired scheme to receive the television broadcast signal from the distributing apparatus and to provide the received television signal to a television for the display thereof.

Here, such a residential television receiving apparatus may include a set-top box and the like.

However, since existing communal television reception systems should ultimately connect the communal antenna, the distributing apparatus, and the residential television receiving apparatus to one another by cables in a wired scheme, the systems are somewhat cumbersome to install and manage while having maintenance problems and problems in terms of disposing and installing cables in the wired scheme thereof, and so on.

The Related Art Document 1 related to a wireless communications method within a building, does not disclose technical contents in which a common wireless distributing apparatus wirelessly transmits a television signal to respective residences within a building.

RELATED ART DOCUMENT

Japanese Patent Laid-Open Publication No. 1996-125600

SUMMARY

Some embodiments of the present disclosure may provide a communal television receiving system and a method thereof in which a common wireless distributing apparatus transmits a television signal to respective wireless residential apparatuses using wireless communication.

According to some embodiments of the present disclosure, a communal television receiving system may include: a common wireless distributing apparatus performing a scanning operation for a wireless local area network (WLAN) communications module included in a preset WLAN communications network, determining transmission power with the WLAN communications module transmitting an acknowledgement (ACK) signal for the scanning operation, converting a received television signal into a WLAN signal having the determined transmission power, and transmitting the WLAN signal; and first to Nth wireless residential apparatuses transmitting the ACK signal as a response to the scanning operation of the common wireless distributing apparatus, receiving the WLAN signal from the common wireless distributing apparatus, and outputting the television signal.

When the wireless residential apparatus which does not transmit the ACK signal is present in the first to Nth wireless residential apparatuses, the common wireless distributing apparatus may determine a most remote wireless residential apparatus among the wireless residential apparatuses transmitting the ACK signal as a relay terminal candidate and may request the corresponding wireless residential apparatus operate as the relay terminal.

When the common wireless distributing apparatus requests the relay terminal, the respective first to Nth wireless residential apparatuses may grant the request, perform the scanning operation for the WLAN communications module which does not transmit the ACK signal among the WLAN communications modules included in the WLAN communications network, determine transmission power with the WLAN communications module transmitting the ACK signal for the scanning operation, convert the received television signal into the WLAN signal having the determined transmission power, and then transmit the WLAN signal.

The common wireless distributing apparatus may determine the transmission power with the WLAN communications module transmitting the ACK signal and then perform an authentication process.

The respective first to Nth wireless residential apparatuses may perform an authentication process in response to the authentication process of the common wireless distributing apparatus.

According to some embodiments of the present disclosure, a communal television receiving method may include: performing, by a common wireless distributing apparatus, a scanning operation for a wireless local area network (WLAN) communications module included in a preset WLAN communications network; receiving an acknowledgment (ACK) signal as a response to the scanning operation; determining transmission power with the WLAN communication module based on the received ACK signal; and converting a received television signal into a WLAN signal having the determined transmission power and transmitting the WLAN signal.

The converting of the received television signal into the WLAN signal having the determined transmission power and transmitting of the WLAN signal may include: determining whether or not the wireless residential apparatus which does not receive the ACK signal is present in first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

The converting of the received television signal into the WLAN signal having the determined transmission power and transmitting of the WLAN signal may include: performing an authentication process for the wireless residential apparatus transmitting the ACK signal; determining whether or not the wireless residential apparatus which does not receive the ACK signal is present in first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

According to some embodiments of the present disclosure, a communal television receiving method may include: receiving, by each of first to Nth wireless residential apparatuses, a scan signal from a common wireless distributing apparatus; transmitting an acknowledgement (ACK) signal as a response to the scan signal; and receiving a wireless local area network (WLAN) signal from the common wireless distributing apparatus using a WLAN communications and outputting a television signal.

The receiving of the WLAN signal and outputting of the television signal may include: determining whether or not a request signal for a relay terminal from the common wireless distributing apparatus is received; when the request signal of the relay terminal is not received, outputting the television signal received from the common wireless distributing apparatus on a screen; and when the request signal of the relay terminal is received, performing an operation as the relay terminal.

The receiving of the WLAN signal and outputting of the television signal may include: performing an authentication process in response to an authentication process of the common wireless distributing apparatus; determining whether a request signal for a relay terminal from the common wireless distributing apparatus is received; when the request signal of the relay terminal is not received, outputting the television signal received from the common wireless distributing apparatus on a screen; and when the request signal of the relay terminal is received, performing an operation as the relay terminal.

The performing of the operation as the relay terminal may include: transmitting the ACK signal as a response to the request signal of the relay terminal; transmitting the scan signal to the wireless residential apparatus which does not transmit the ACK signal among the first to Nth wireless residential apparatuses; receiving the ACK signal from the wireless residential apparatus; determining transmission power based on the received ACK signal; determining whether or not the wireless residential apparatus which does not receive the ACK signal is present in the first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

The performing of the operation as the relay terminal may include: transmitting the ACK signal as a response to the request signal of the relay terminal; transmitting the scan signal to the wireless residential apparatus which does not transmit the ACK signal among the first to Nth wireless residential apparatuses; receiving the ACK signal from the wireless residential apparatus; determining transmission power based on the received ACK signal; performing an authentication process for the wireless residential apparatus transmitting the ACK signal; determining whether or not the wireless residential apparatus which does not receive the ACK signal is present in the first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

According to some embodiments of the present disclosure, a communal television receiving method may include: performing, by a common wireless distributing apparatus, a scanning operation for a wireless local area network (WLAN) communications module included in a preset WLAN communications network; receiving an acknowledgment (ACK) signal as a response to the scanning operation; determining transmission power with the WLAN communication module based on the received ACK signal; converting a received television signal into a WLAN signal having the determined transmission power and transmitting the WLAN signal; receiving, by each of first to Nth wireless residential apparatuses, a scan signal from a common wireless distributing apparatus; transmitting an acknowledgement (ACK) signal as a response to the scan signal; and receiving a wireless local area network (WLAN) signal from the common wireless distributing apparatus using a WLAN communications and outputting a television signal.

The converting of the received television signal into the WLAN signal having the determined transmission power and transmitting of the WLAN signal may include: determining whether or not the wireless residential apparatus which does not receive the ACK signal is present in first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

The receiving of the WLAN signal and outputting of the television signal may include: determining whether or not a request signal for a relay terminal from the common wireless distributing apparatus is received; when the request signal of the relay terminal is not received, outputting the television signal received from the common wireless distributing apparatus on a screen; and when the request signal of the relay terminal is received, performing an operation as the relay terminal.

The performing of the operation as the relay terminal may include: transmitting the ACK signal as a response to the request signal of the relay terminal; transmitting the scan signal to the wireless residential apparatus which does not transmit the ACK signal among the first to Nth wireless residential apparatuses; receiving the ACK signal from the wireless residential apparatus; determining transmission power based on the received ACK signal; determining whether or not the wireless residential apparatus which does not receive the ACK signal is present in the first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

According to some embodiments of the present disclosure, a communal television receiving method may include: performing, by a common wireless distributing apparatus, a scanning operation for a wireless local area network (WLAN) communications module included in a preset WLAN communications network; receiving an acknowledgment (ACK) signal as a response to the scanning operation; determining transmission power with the WLAN communication module based on the received ACK signal; performing an authentication process for the wireless residential apparatus transmitting the ACK signal, converting a received television signal into a WLAN signal having the determined transmission power and then transmitting the WLAN signal; receiving, by each of first to Nth wireless residential apparatuses, a scan signal from a common wireless distributing apparatus; transmitting an acknowledgement (ACK) signal as a response to the scan signal; and performing an authentication process with the common wireless distributing apparatus and then receiving a WLAN signal from the common wireless distributing apparatus using a WLAN communications, and outputting a television signal.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
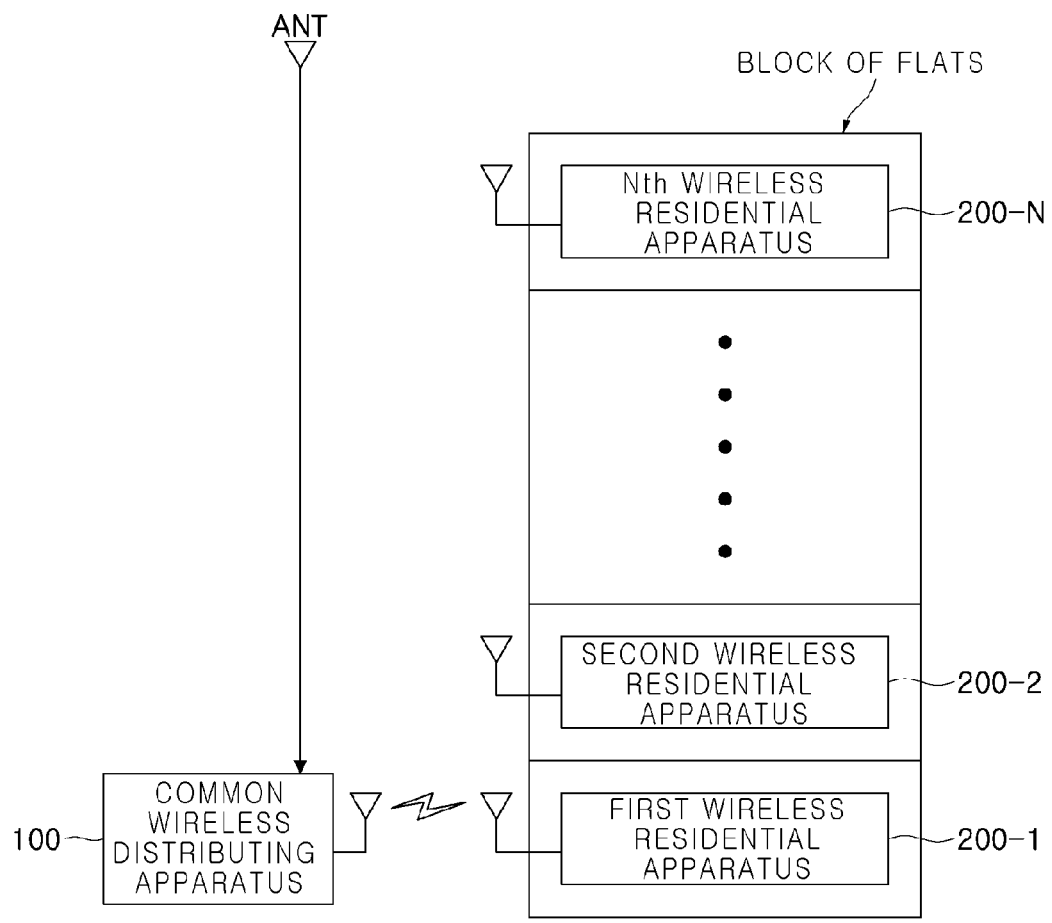
FIG. 1 is a configuration diagram of a communal television receiving system according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a configuration diagram of a communal television receiving system according to an exemplary embodiment of the present disclosure.

Referring to FIG. 1, a communal television receiving system according to an exemplary embodiment of the present disclosure may include a common wireless distributing apparatus 100 and first to Nth (N is a natural number of at least 2) wireless residential apparatuses 200-1 to 200-N.

The common wireless distributing apparatus 100 may perform a scanning operation for a wireless local area network (WLAN) communication module included in a preset WLAN communication network, determine transmission power with the WLAN communication module transmitting an acknowledgement (ACK) signal for the scanning operation, convert a television signal which has been received through an antenna (ANT) or a cable into a WLAN signal having the determined transmission power, and transmit the WLAN signal.

In this case, each of the common wireless distributing apparatus 100 and the first to Nth wireless residential apparatuses 200-1 to 200-N may include the WLAN communication module for performing a WLAN communication.

Here, the WLAN communication may be one of WLAN communication specifications according to IEEE 802.15.11x (x is a, b, g, n, ac, and so on) communication specification, and an exemplary embodiment of the present disclosure may use WiFi communication specification (IEEE 802.15.11b, g, n, ac, and so on) considering a communication rate. For example, the WLAN communication module may be a WiFi communication module.

Thereafter, the common wireless distributing apparatus 100 may determine the wireless residential apparatuses which do not receive an ACK signal among the first to Nth wireless residential apparatuses 200-1 to 200-N by receiving the ACK signal as a response signal to the scan signal.

For example, in the case in which the wireless residential apparatuses which do not transmit the ACK signal among the first to Nth wireless residential apparatuses 200-1 to 200-N are present, the common wireless distributing apparatus 100 may determine the most remote wireless residential apparatus among the wireless residential apparatuses transmitting the ACK signal as being a relay terminal candidate, and may request the corresponding wireless residential apparatus operate as the relay terminal.

The respective first to Nth wireless residential apparatuses 200-1 to 200-N may transmit the ACK signal as the response to the scanning operation of the common wireless distribution apparatus 100 and receive the WLAN signal from the common wireless distributing apparatus 100, thereby outputting a television signal.

In this case, when the respective first to Nth wireless residential apparatuses 200-1 to 200-N receive a scan signal which is transmitted from the common wireless distributing apparatus 100 in a broadcasting scheme, the respective first to Nth wireless residential apparatuses 200-1 to 200-N may transmit the ACK signal as a response signal to the scan signal to the common wireless distributing apparatus 100.

Thereafter, when the common wireless distributing apparatus 100 requests a relay terminal, the respective first to Nth wireless residential apparatuses 200-1 to 200-N may grant the request, perform the scanning operation for the WLAN communications modules which do not transmit the ACK signal among the WLAN communications modules included in the WLAN communications network, determine transmission power with the WLAN communications module transmitting the ACK signal for the scanning operation, covert the received television signal into a WLAN signal having the determined transmission power, and then transmit the WLAN signal.

Figure 2:
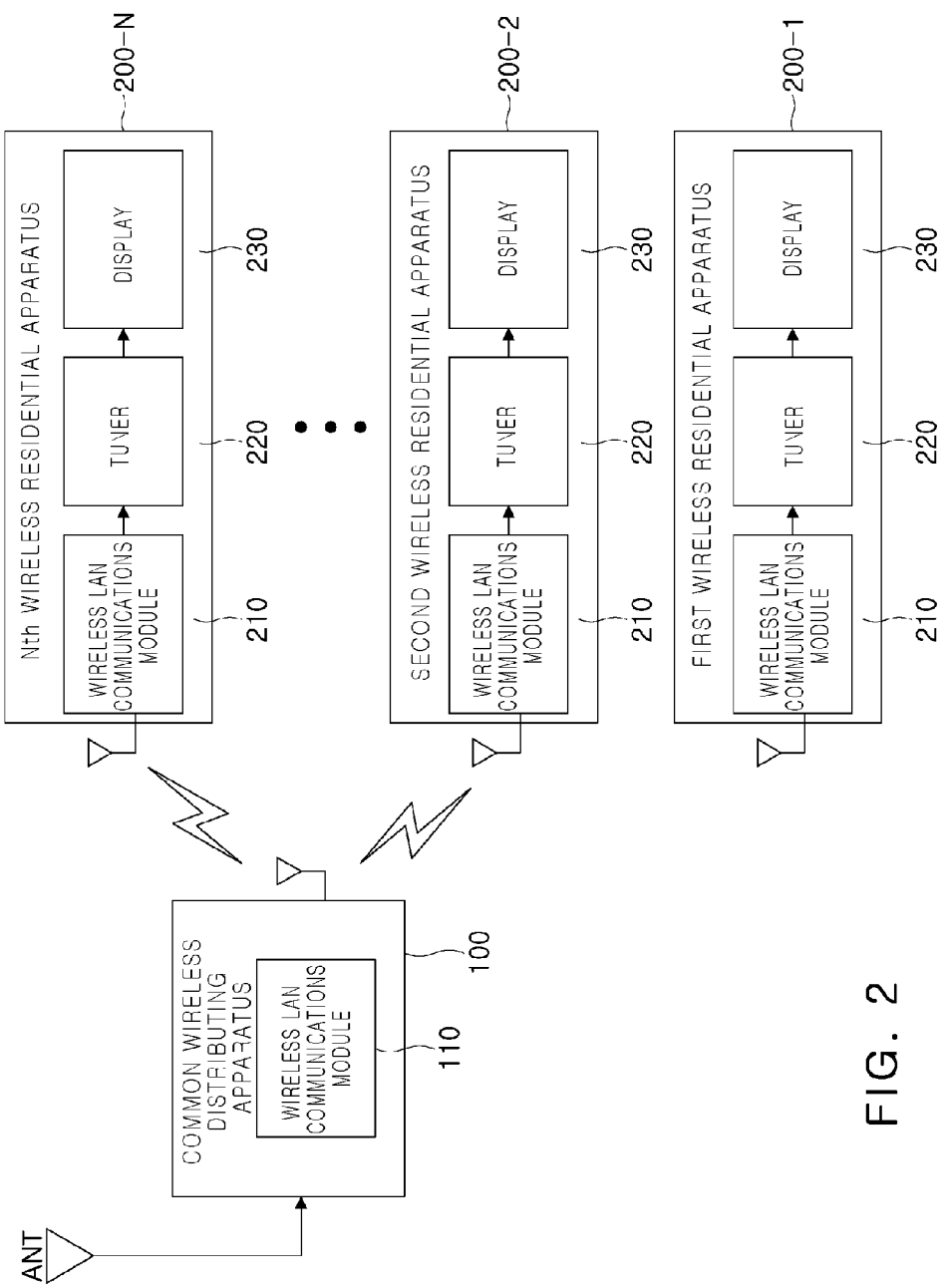
FIG. 2 is an internal block diagram of a communal television receiving system according to an exemplary embodiment of the present disclosure.

FIG. 2 is an internal block diagram of a communal television receiving system according to an exemplary embodiment of the present disclosure.

Referring to FIG. 2, the common wireless distributing apparatus 100 may include the WLAN communications module 110 for performing the operation as described above.

Each of the first to Nth wireless residential apparatuses 200-1 to 200-N may include a WLAN communications module 210, a tuner 220, and a display 230.

The WLAN communications module 210 may perform WLAN communications with the WLAN communications module 110 of the common wireless distributing apparatus 100, transmit the ACK signal for the scan signal, receive a television signal using the WLAN communications, and transfer the television signal to the tuner 220.

The tuner 220 may tune a channel selected by a respective residence and provide the television signal of the selected channel to the display 230.

The display 230 may output the television signal, for example, a television image and sound.

Figure 3:
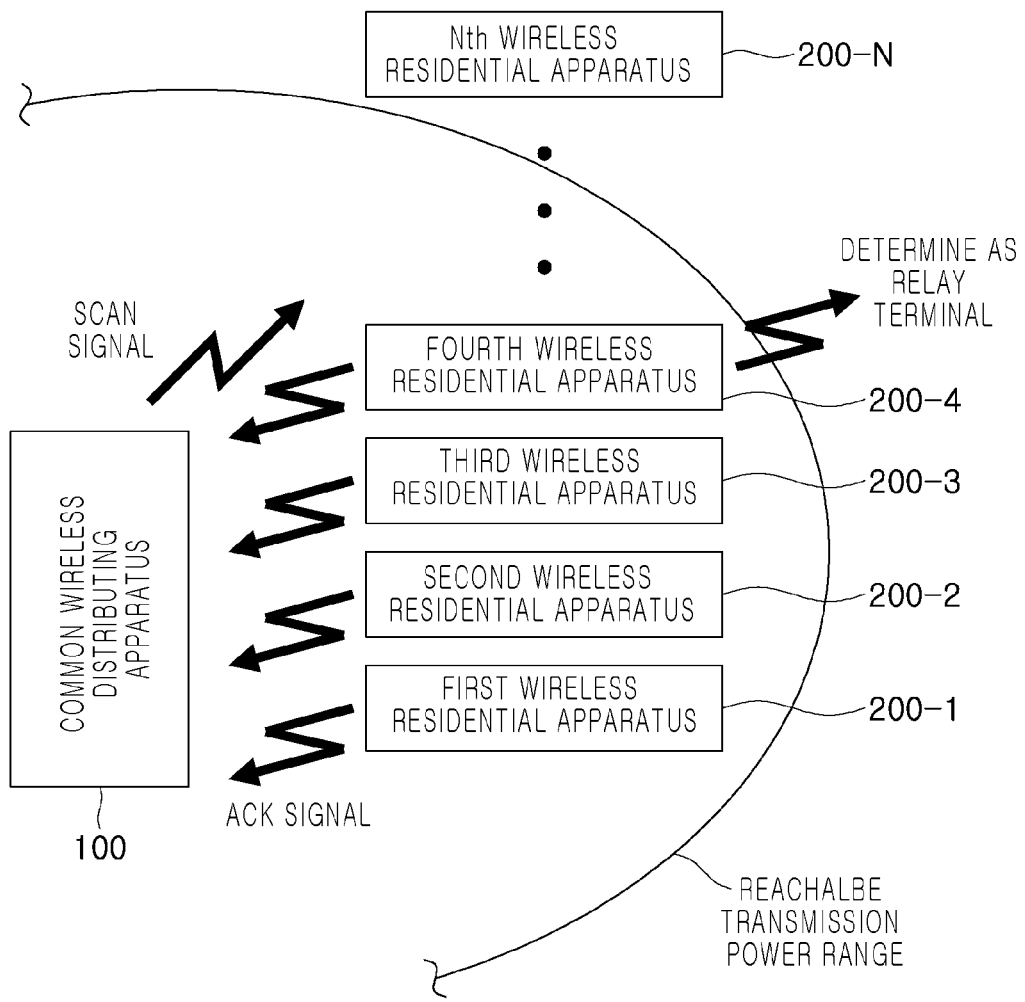
FIG. 3 is a diagram describing a determination of a relay terminal depending on transmission power according to an exemplary embodiment of the present disclosure.

FIG. 3 is a diagram describing a determination of a relay terminal depending on transmission power according to an exemplary embodiment of the present disclosure.

Referring to FIG. 3, the common wireless distributing apparatus 100 may transmit the scan signal to all the first to Nth wireless residential apparatuses 200-1 to 200-N in the broadcasting scheme using the WLAN communications.

Here, transmission power at which the scan signal is transmitted may be determined as appropriate power in consideration of power consumption.

For example, in the case in which the scan signal is arrived up to first, second, third, and fourth wireless residential apparatuses 200-1 to 200-4 among the first to Nth wireless residential apparatuses 200-1 to 200-N and the common wireless distributing apparatus 100 receives the ACK signal as a response to the scan signal, the common wireless distributing apparatus 100 may request the fourth wireless residential apparatus 200-4 operate as a relay terminal by determining the fourth wireless residential apparatus 200-4 as being a relay terminal candidate.

Meanwhile, the common wireless distributing apparatus 100 may determine the transmission power with the WLAN communications module transmitting the ACK signal and then may perform an authentication process.

In this case, the respective first to Nth wireless residential apparatuses 200-1 to 200-N may perform authentication process in response to the authentication process of the common wireless distributing apparatus 100.

For example, in the case in which the common wireless distribution apparatus 100 requests the wireless residential apparatus transmitting the ACK signal among the first to Nth wireless residential apparatuses 200-1 to 200-N to send an authentication password and then verifies a residential input password received according to the this request and a subscriber authentication password which is prepared in advance. When the residential password and the subscriber authentication password coincide with each other, the common wireless distributing apparatus 100 may transmit the television signal and when they do not coincide with each other, the common wireless distributing apparatus 100 may not transmit the television signal, but transmit a mismatch signal.

Figure 4:
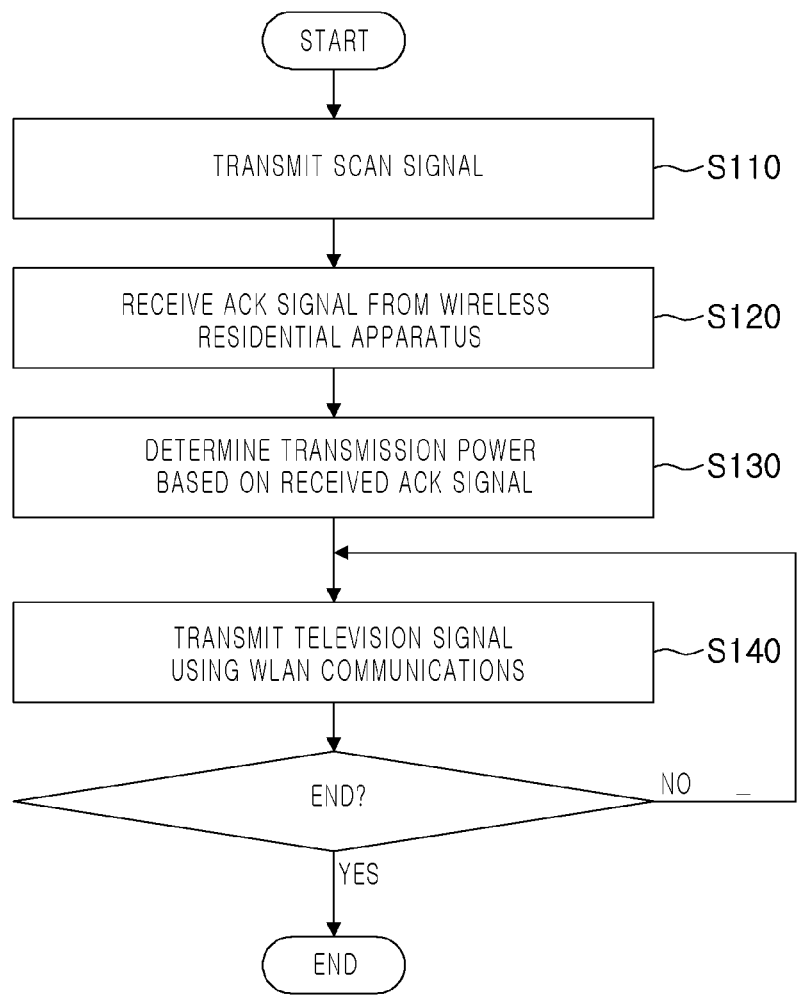
FIG. 4 is a flow chart of a first transmitting process of a communal television receiving method according to an exemplary embodiment of the present disclosure.
Figure 5:
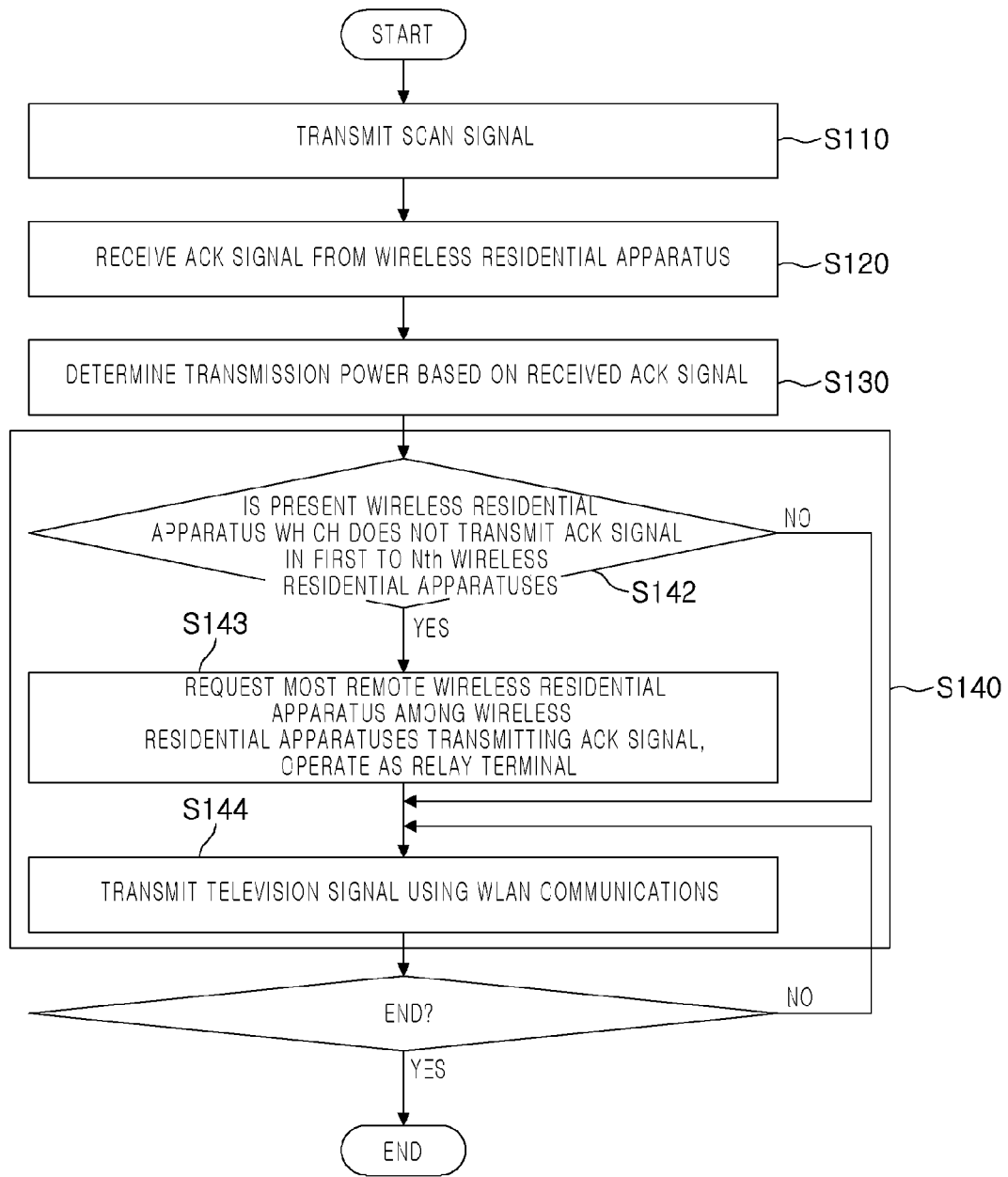
FIG. 5 is a flow chart of a second transmitting process of a communal television receiving method according to an exemplary embodiment of the present disclosure.
Figure 6:
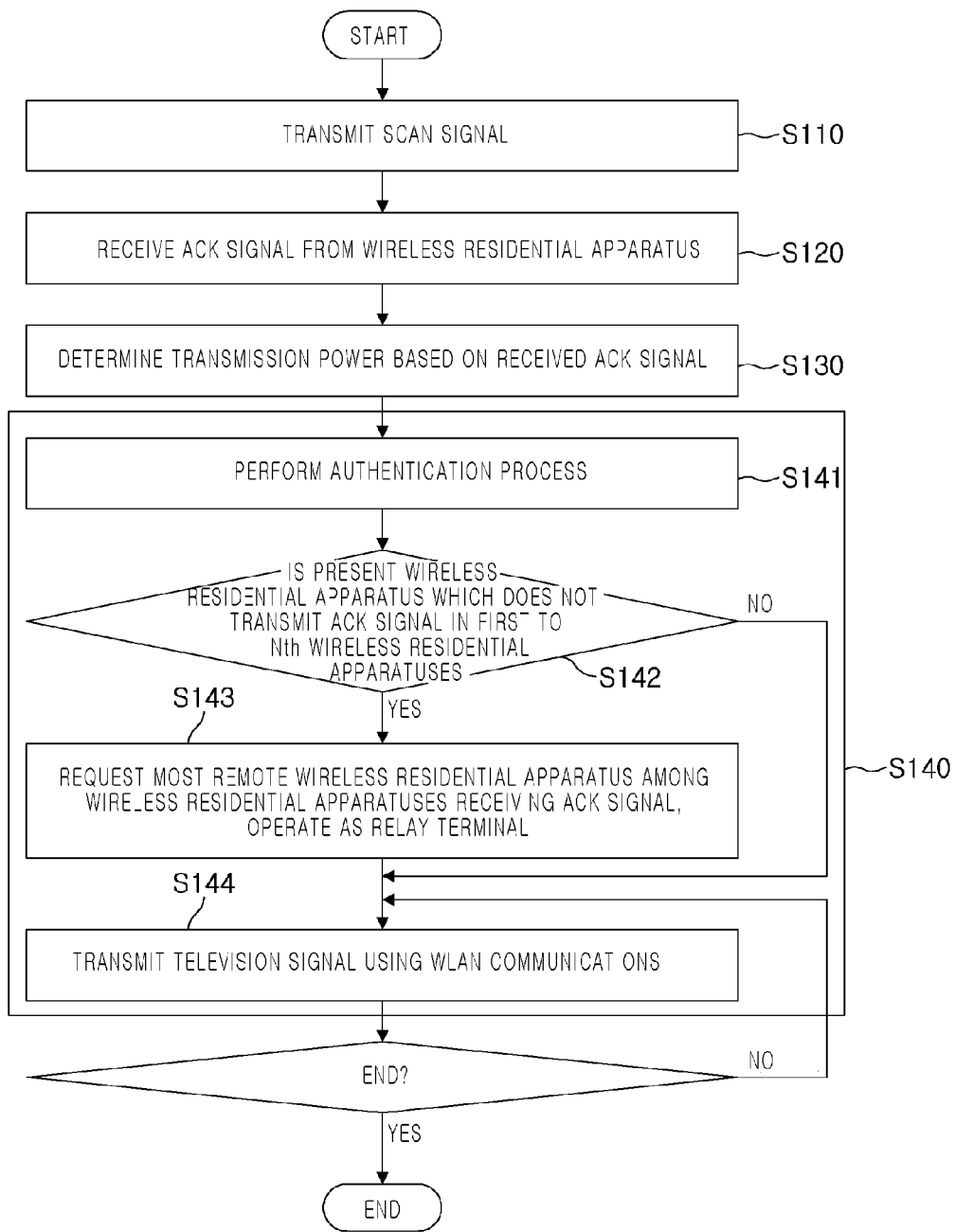
FIG. 6 is a flow chart of a third transmitting process of a communal television receiving method according to an exemplary embodiment of the present disclosure.

FIG. 4 is a flow chart of a first transmitting process of a communal television receiving method according to an exemplary embodiment of the present disclosure, FIG. 5 is a flow chart of a second transmitting process of a communal television receiving method according to an exemplary embodiment of the present disclosure, and FIG. 6 is a flow chart of a third transmitting process of a communal television receiving method according to an exemplary embodiment of the present disclosure.

A communal television receiving method according to an exemplary embodiment of the present disclosure will be described with reference to FIGS. 1 through 6.

Hereinafter, in describing a communal television receiving method according to an exemplary embodiment of the present disclosure, the description for the operations performed with reference to FIGS. 1 through 3 may be applied thereto. Therefore, a detailed description overlapped in the description of the communal television receiving method will be omitted.

Referring to FIGS. 1 through 6, in S110, a common wireless distributing apparatus 100 may perform a scanning operation for a wireless local area network (WLAN) communications module included in a preset WLAN communications network. Here, the WLAN communications module may be a WiFi communications module and the respective first to Nth wireless residential apparatuses 200-1 to 200-N may include the WiFi communications module.

In S120, the common wireless distributing apparatus 100 may receive an acknowledgement (ACK) signal as a response to the scanning operation.

For example, when the respective first to Nth wireless residential apparatuses 200-1 to 200-N receive a scan signal from the common wireless distributing apparatus 100 using the WLAN communications module, the respective first to Nth wireless residential apparatuses 200-1 to 200-N may transmit the ACK signal as a response to the scan signal.

In S130, the common wireless distributing apparatus 100 may determine transmission power with the WLAN communications module of the respective first to Nth wireless residential apparatuses 200-1 to 200-N, based on the received ACK signal.

For example, in the case in which no ACK signal has been received from all the first to Nth wireless residential apparatuses 200-1 to 200-N, the common wireless distributing apparatus 100 may increase the transmission power and may again transmit the scan signal. Also in the case in which the number of the wireless residential apparatuses transmitting the ACK signal is below the preset reference number, the common wireless distributing apparatus 100 may further increase the transmission power.

In this case, the reference number may be set in advance such that power consumption may be reduced in a condition capable of performing the WLAN communications.

In S140, the common wireless distributing apparatus 100 may convert the television signal received through an antenna (ANT) or a cable into a WLAN signal having the determined transmission power and may transmit the WLAN signal.

The operation (S140) of converting the television signal into the WLAN signal and transmitting the WLAN signal will be described with reference to FIGS. 1 through 5.

In S142, the common wireless distributing apparatus 100 may determine whether or not a wireless residential apparatus which does not receive the ACK signal among the first to Nth wireless residential apparatuses 200-1 to 200-N is present.

In S143, when the wireless residential apparatus which does not receive the ACK signal is present, the common wireless distributing apparatus 100 may request the most remote wireless residential apparatus among the wireless residential apparatuses receiving the ACK signal, operate as a relay terminal. Here, a reference of the most remote distance may be, for example, a received strength of the ACK signal, or a preset physical distance from the WLAN communications module, but is not limited thereto.

In addition, in S144, the common wireless distributing apparatus 100 may transmit the WLAN signal converted from the television signal to the wireless residential apparatus transmitting the ACK signal.

The operation (S140) of converting the television signal into the WLAN signal and transmitting the WLAN signal will be described with reference to FIGS. 1 through 4 and 6.

Referring to FIG. 6, the communal television receiving method shown in FIG. 5 may further include S141.

In S141, the common wireless distributing apparatus 100 may perform an authentication process for the wireless residential apparatus having transmitted the ACK signal.

For example, in the case in which the common wireless distribution apparatus 100 requests the wireless residential apparatus having transmitted the ACK signal among the first to Nth wireless residential apparatuses 200-1 to 200-N, to send an authentication password and verifies a input password for a respective residence received according to the this request and a subscriber authentication password which is prepared in advance. When the residential password and the subscriber authentication password coincide with each other, the common wireless distributing apparatus 100 may transmit the television signal, and when they do not coincide with each other, the common wireless distributing apparatus 100 may not transmit the television signal, but may transmit a mismatch signal.

Figure 7:
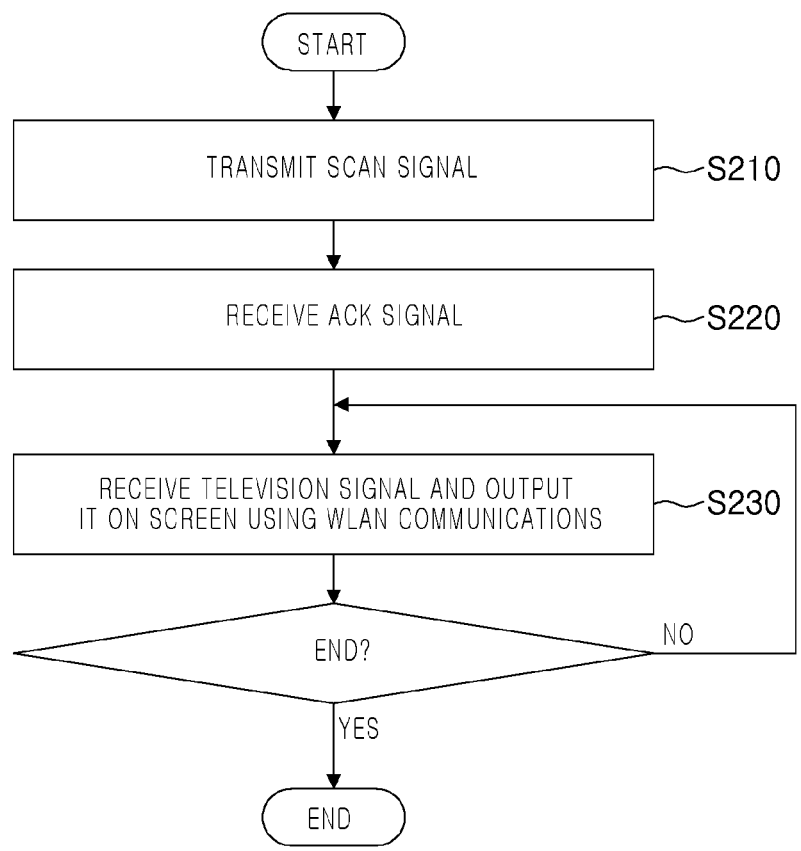
FIG. 7 is a flow chart of a first receiving process of a communal television receiving method according to an exemplary embodiment of the present disclosure.
Figure 8:
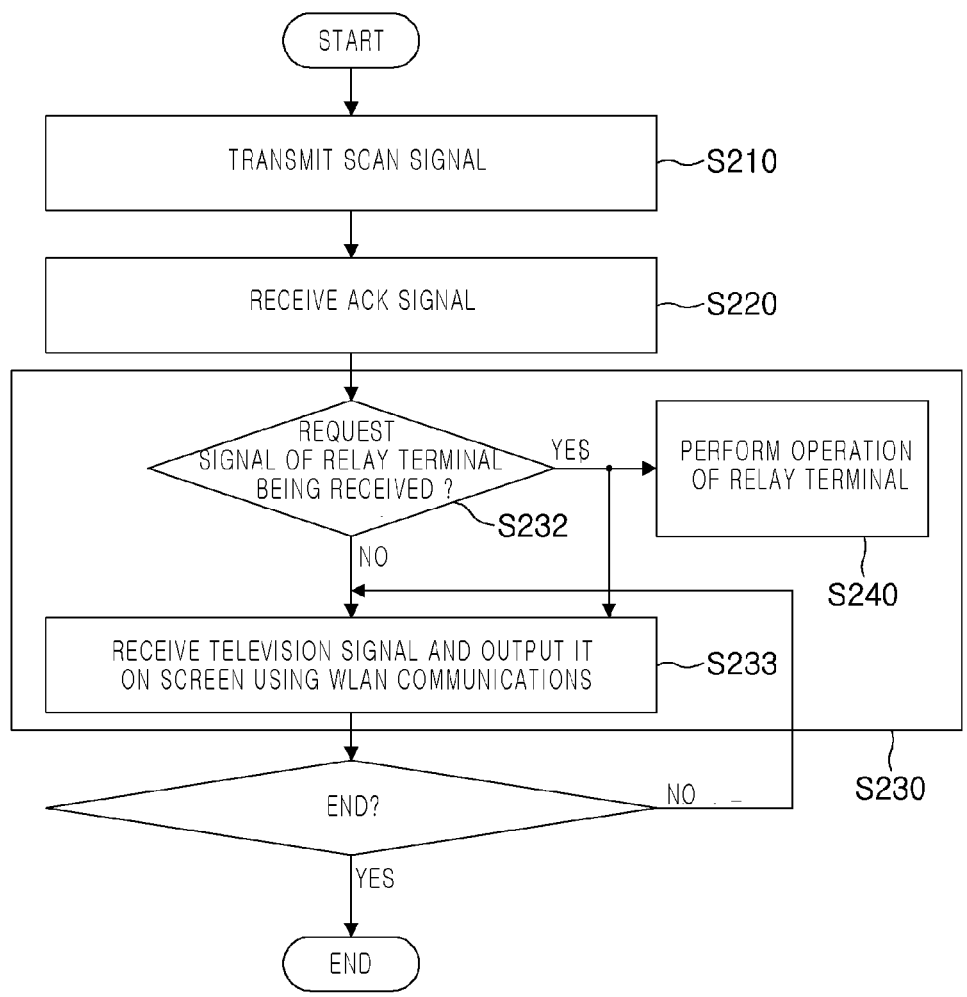
FIG. 8 is a flow chart of a second receiving process of a communal television receiving method according to an exemplary embodiment of the present disclosure.
Figure 9:
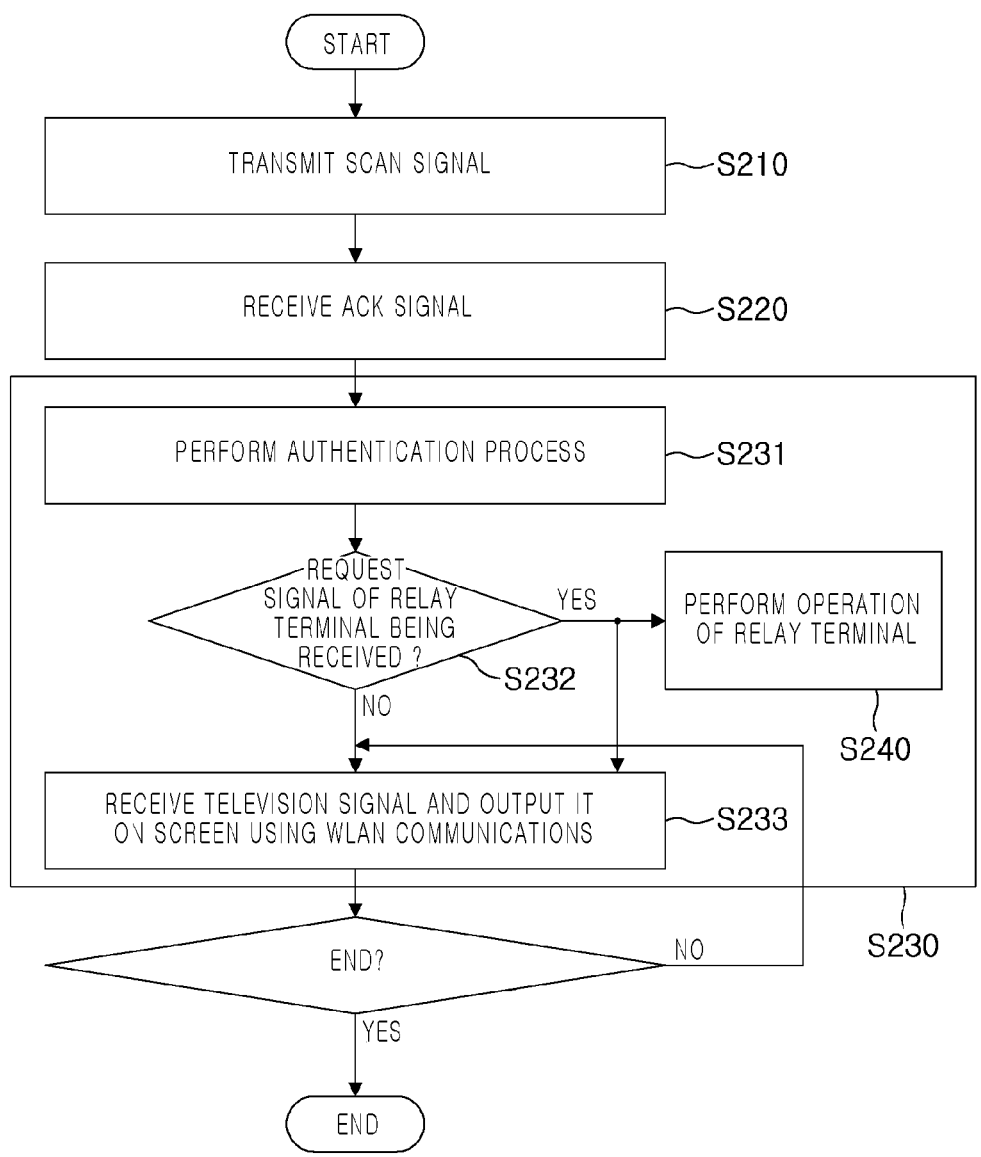
FIG. 9 is a flow chart of a third receiving process of a communal television receiving method according to an exemplary embodiment of the present disclosure.

FIG. 7 is a flow chart of a first receiving process of a communal television receiving method according to an exemplary embodiment of the present disclosure, FIG. 8 is a flow chart of a second receiving process of a communal television receiving method according to an exemplary embodiment of the present disclosure, and FIG. 9 is a flow chart of a third receiving process of a communal television receiving method according to an exemplary embodiment of the present disclosure.

A communal television receiving method according to an exemplary embodiment of the present disclosure will be described with reference to FIGS. 1 through 9.

Hereinafter, in describing a communal television receiving method according to an exemplary embodiment of the present disclosure, the description for the operations performed with reference to FIGS. 1 through 3 may be applied thereto. Therefore, a detailed description overlapped in the description of the communal television receiving method will be omitted.

Referring to FIGS. 1 through 9, in S210, the respective first to Nth wireless residential apparatuses 200-1 to 200-N may receive a scan signal from the common wireless distributing apparatus 100 using the WLAN communications module.

For example, all of the first to Nth wireless residential apparatuses 200-1 to 200-N may receive the scan signal and only a portion of the first to Nth wireless residential apparatuses 200-1 to 200-N may receive the scan signal.

However, the first to Nth wireless residential apparatuses 200-1 to 200-N may not receive the scan signal. In this case, the common wireless distributing apparatus 100 may increase the transmission power and again transmit the scan signal.

In S220, the wireless residential apparatus receiving the scan signal may transmit the ACK signal as a response to the scan signal. Since the ACK signal includes identification information of the WLAN communications module, the common wireless distributing apparatus 100 may identify the residential apparatus in which the WLAN communications module is included.

In S230, the corresponding wireless residential apparatus may receive the WLAN signal from the common wireless distributing apparatus 100 using the WLAN communications and output the television signal.

The operation (S230) of receiving the WLAN signal and outputting the television signal will be described with reference to FIGS. 1 through 8.

In S232, whether or not the request signal of the relay terminal has been received from the common wireless distributing apparatus 100 may be determined.

In S232, in the case in which the request signal of the relay terminal has not been received, the television signal received from the common wireless distributing apparatus 100 may be output on a screen.

In addition, in S240, in the case in which the request signal of the relay terminal has been received, an operation as the relay terminal may be performed. This will be described with reference to FIGS. 10 and 11.

Referring to FIGS. 1 through 9, the operation (S230) of receiving the WLAN signal and outputting the television signal may further include S232 in the communal television receiving method shown in FIG. 8.

In S232, the authentication process may be performed in response to the authentication process of the common wireless distributing apparatus 100. Here, the authentication process may be performed as described above.

Figure 10:
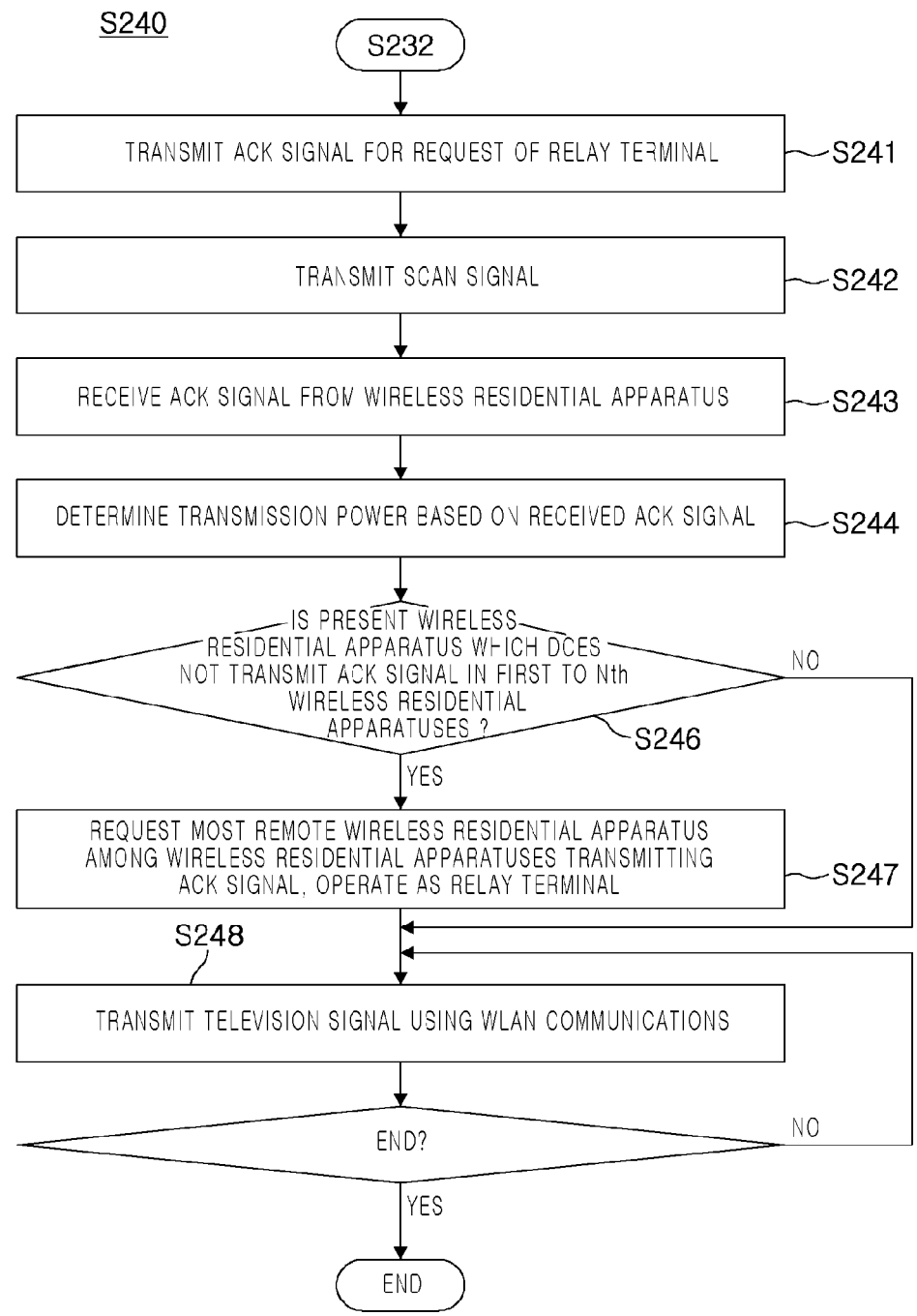
FIG. 10 is a diagram describing a first operation of a relay terminal according to an exemplary embodiment of the present disclosure.
Figure 11:
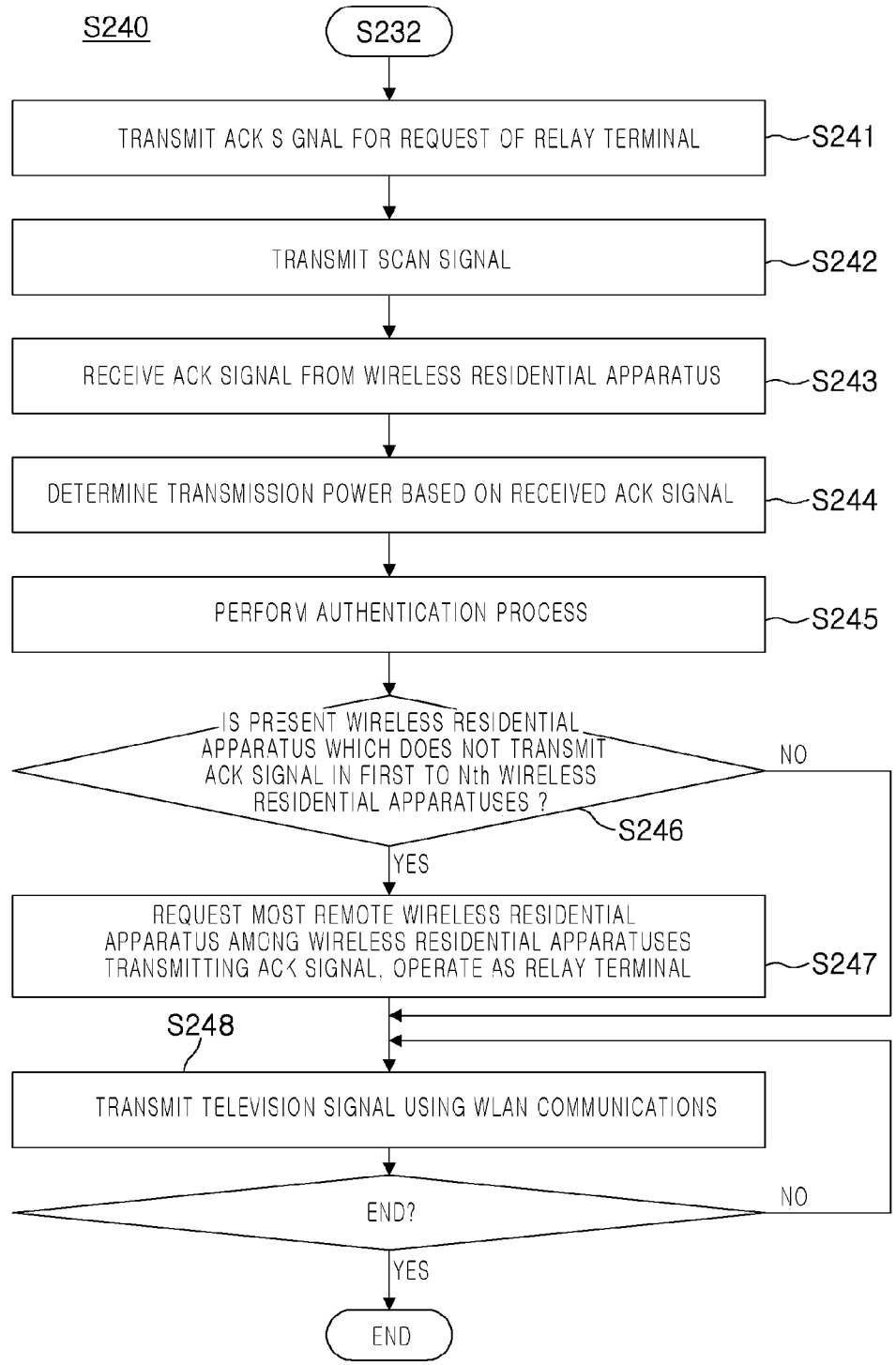
FIG. 11 is a diagram describing a second operation of a relay terminal according to an exemplary embodiment of the present disclosure.

FIG. 10 is a diagram describing a first operation of a relay terminal according to an exemplary embodiment of the present disclosure and FIG. 11 is a diagram describing a second operation of a relay terminal according to an exemplary embodiment of the present disclosure.

The operation (S240) of performing the operation as the relay terminal will be described with reference to FIGS. 10 and 11.

First, in S241, when one wireless residential apparatus of the first to Nth wireless residential apparatuses 200-1 to 200-N receives the request signal of the relay terminal, one wireless residential apparatus may transmit the ACK signal as a response to the request signal for the relay terminal.

In S242, the wireless residential apparatus (hereinafter, referred to as a relay terminal) receiving the request of the relay terminal may again transmit the scan signal to the wireless residential apparatus which does not receive the ACK signal among the first to Nth wireless residential apparatuses. Since the ACK signal includes an identification number of the WLAN communications module for a respective residence, the respective residence may be identified thereby.

In S243, the relay terminal may again receive the ACK signal from the wireless residential apparatus.

In S244, the relay terminal may determine the transmission power based on the received ACK signal. Here, the operation of determining the transmission power is equal to the operation of determining the transmission power by the common wireless distributing apparatus 100.

In S246, whether or not a wireless residential apparatus which does not receive the ACK signal among the first to Nth wireless residential apparatuses 200-1 to 200-N is present may be determined.

In S247, when the wireless residential apparatus which does not receive the ACK signal is present, the most remote wireless residential apparatus among the wireless residential apparatuses having received the ACK signal may again be requested as the relay terminal. Through these operations, no relay terminal may be present in the first to Nth wireless residential apparatuses 200-1 to 200-N, or one or a plurality of relay terminals may be present in the first to Nth wireless residential apparatuses 200-1 to 200-N.

In S248, the WLAN signal converted from the television signal may be transmitted to the wireless residential apparatus transmitting the ACK signal.

Referring to FIG. 11, operation S245 may be further performed in addition to the operation (S240) of performing the operation as the relay terminal shown in FIG. 10.

In S245, the authentication process for the wireless residential apparatus having transmitted the ACK signal may be performed, and the television signal may be transmitted to the wireless residential apparatus authenticated through the authentication process, using the WLAN communications.

According to exemplary embodiments of the present disclosure, since the common wireless distributing apparatus may transmit the television signal to respective wireless residential apparatuses using the wireless LAN communication such as WiFi communication, the installation and maintenance may be convenient in the block of flats using the communal television receiving system.

While exemplary embodiments have been shown and described above, it will be apparent to those skilled in the art that modifications and variations could be made without departing from the spirit and scope of the present disclosure as defined by the appended claims.

What is claimed is:

1. A communal television receiving system, comprising: a common wireless distributing apparatus performing a scanning operation for a wireless local area network (WLAN) communications module included in a WLAN communications network, determining transmission power with the WLAN communications module transmitting an acknowledgement (ACK) signal for the scanning operation, converting a received television signal into a WLAN signal having the determined transmission power, and transmitting the WLAN signal; and first to Nth wireless residential apparatuses transmitting the ACK signal as a response to the scanning operation of the common wireless distributing apparatus, receiving the WLAN signal from the common wireless distributing apparatus, and outputting the television signal; wherein when the wireless residential apparatus which does not transmit the ACK signal is present in the first to Nth wireless residential apparatuses, the common wireless distributing apparatus determines a most remote wireless residential apparatus among the wireless residential apparatuses transmitting the ACK signal as a relay terminal candidate and requests the corresponding wireless residential apparatus operate as the relay terminal.

2. The communal television receiving system of claim 1, wherein when the common wireless distributing apparatus requests the relay terminal, the respective first to Nth wireless residential apparatuses grant the request, perform the scanning operation for the WLAN communications module which does not transmit the ACK signal among the WLAN communications modules included in the WLAN communications network, determine transmission power with the WLAN communications module transmitting the ACK signal for the scanning operation, convert the received television signal into the WLAN signal having the determined transmission power, and then transmit the WLAN signal.

3. The communal television receiving system of claim 1, wherein the common wireless distributing apparatus determines the transmission power with the WLAN communications module transmitting the ACK signal and then performs an authentication process.

4. The communal television receiving system of claim 1, wherein the respective first to Nth wireless residential apparatuses perform an authentication process in response to the authentication process of the common wireless distributing apparatus.

5. A communal television receiving method, comprising: performing, by a common wireless distributing apparatus, a scanning operation for a wireless local area network (WLAN) communications module included in a preset WLAN communications network; receiving an acknowledgment (ACK) signal as a response to the scanning operation; determining transmission power with the WLAN communication module based on the received ACK signal; and converting a received television signal into a WLAN signal having the determined transmission power and transmitting the WLAN signal; wherein the converting of the received television signal into the WLAN signal having the determined transmission power and transmitting of the WLAN signal includes: determining whether or not the wireless residential apparatus which does not receive the ACK signal is present in first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

6. The communal television receiving method of claim 5, wherein the converting of the received television signal into the WLAN signal having the determined transmission power and transmitting of the WLAN signal includes: performing an authentication process for the wireless residential apparatus transmitting the ACK signal; determining whether or not the wireless residential apparatus which does not receive the ACK signal is present in first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

7. A communal television receiving method, comprising: receiving, by each of first to Nth wireless residential apparatuses, a scan signal from a common wireless distributing apparatus; transmitting an acknowledgement (ACK) signal as a response to the scan signal; and receiving a wireless local area network (WLAN) signal from the common wireless distributing apparatus using a WLAN communications and outputting a television signal; wherein the performing of the operation as the relay terminal includes: transmitting the ACK signal as a response to the request signal of the relay terminal; transmitting the scan signal to the wireless residential apparatus which does not transmit the ACK signal among the first to Nth wireless residential apparatuses; receiving the ACK signal from the wireless residential apparatus; determining transmission power based on the received ACK signal; determining whether or not the wireless residential apparatus which does not receive the ACK signal is present in the first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

8. The communal television receiving method of claim 7, wherein the receiving of the WLAN signal and outputting of the television signal includes: determining whether or not a request signal for a relay terminal from the common wireless distributing apparatus is received; when the request signal of the relay terminal is not received, outputting the television signal received from the common wireless distributing apparatus on a screen; and when the request signal of the relay terminal is received, performing an operation as the relay terminal.

9. The communal television receiving method of claim 8, wherein the receiving of the WLAN signal and outputting of the television signal includes: performing an authentication process in response to an authentication process of the common wireless distributing apparatus; determining whether a request signal for a relay terminal from the common wireless distributing apparatus is received; when the request signal of the relay terminal is not received, outputting the television signal received from the common wireless distributing apparatus on a screen; and when the request signal of the relay terminal is received, performing an operation as the relay terminal.

10. The communal television receiving method of claim 9, wherein the performing of the operation as the relay terminal includes: transmitting the ACK signal as a response to the request signal of the relay terminal; transmitting the scan signal to the wireless residential apparatus which does not transmit the ACK signal among the first to Nth wireless residential apparatuses; receiving the ACK signal from the wireless residential apparatus; determining transmission power based on the received ACK signal; performing an authentication process for the wireless residential apparatus transmitting the ACK signal; determining whether or not the wireless residential apparatus which does not receive the ACK signal is present in the first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

11. A communal television receiving method, comprising: performing, by a common wireless distributing apparatus, a scanning operation for a wireless local area network (WLAN) communications module included in a preset WLAN communications network; receiving an acknowledgment (ACK) signal as a response to the scanning operation; determining transmission power with the WLAN communication module based on the received ACK signal; converting a received television signal into a WLAN signal having the determined transmission power and transmitting the WLAN signal; receiving, by each of first to Nth wireless residential apparatuses, a scan signal from a common wireless distributing apparatus; transmitting an acknowledgement (ACK) signal as a response to the scan signal; and receiving a wireless local area network (WLAN) signal from the common wireless distributing apparatus using a WLAN communications and outputting a television signal; wherein the converting of the received television signal into the WLAN signal having the determined transmission power and transmitting of the WLAN signal includes: determining whether or not the wireless residential apparatus which does not receive the ACK signal is present in first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

12. The communal television receiving method of claim 11, wherein the receiving of the WLAN signal and outputting of the television signal includes: determining whether or not a request signal for a relay terminal from the common wireless distributing apparatus is received; when the request signal of the relay terminal is not received, outputting the television signal received from the common wireless distributing apparatus on a screen; and when the request signal of the relay terminal is received, performing an operation as the relay terminal.

13. The communal television receiving method of claim 12, wherein the performing of the operation as the relay terminal includes: transmitting the ACK signal as a response to the request signal of the relay terminal; transmitting the scan signal to the wireless residential apparatus which does not transmit the ACK signal among the first to Nth wireless residential apparatuses; receiving the ACK signal from the wireless residential apparatus; determining transmission power based on the received ACK signal; determining whether or not the wireless residential apparatus which does not receive the ACK signal is present in the first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

14. A communal television receiving method, comprising: performing, by a common wireless distributing apparatus, a scanning operation for a wireless local area network (WLAN) communications module included in a preset WLAN communications network; receiving an acknowledgment (ACK) signal as a response to the scanning operation; determining transmission power with the WLAN communication module based on the received ACK signal; performing an authentication process for the wireless residential apparatus transmitting the ACK signal, converting a received television signal into a WLAN signal having the determined transmission power and then transmitting the WLAN signal; receiving, by each of first to Nth wireless residential apparatuses, a scan signal from a common wireless distributing apparatus; transmitting an acknowledgement (ACK) signal as a response to the scan signal; and performing an authentication process with the common wireless distributing apparatus and then receiving a WLAN signal from the common wireless distributing apparatus using a WLAN communications, and outputting a television signal; wherein the converting of the received television signal into the WLAN signal having the determined transmission power and transmitting of the WLAN signal includes: performing an authentication process for the wireless residential apparatus transmitting the ACK signal; determining whether or not the wireless residential apparatus which does not receive the ACK signal is present in first to Nth wireless residential apparatuses; when the wireless residential apparatus which does not receive the ACK signal is present, requesting a most remote wireless residential apparatus among the wireless residential apparatuses receiving the ACK signal operate as a relay terminal; and transmitting the WLAN signal into which the television signal is converted.

15. The communal television receiving method of claim 14, wherein the receiving of the WLAN signal and outputting of the television signal includes: performing authentication process in response to the authentication process of the common wireless distributing apparatus; determining whether or not a request signal for a relay terminal from the common wireless distributing apparatus is received; when the request signal of the relay terminal is not received, outputting the television signal received from the common wireless distributing apparatus on a screen; and when the request signal of the relay terminal is received, performing an operation as the relay terminal.

* * * * *